June 21, 1938.  G. SOLOMON  2,121,576
CLAMP
Filed Sept. 1, 1937  2 Sheets-Sheet 1
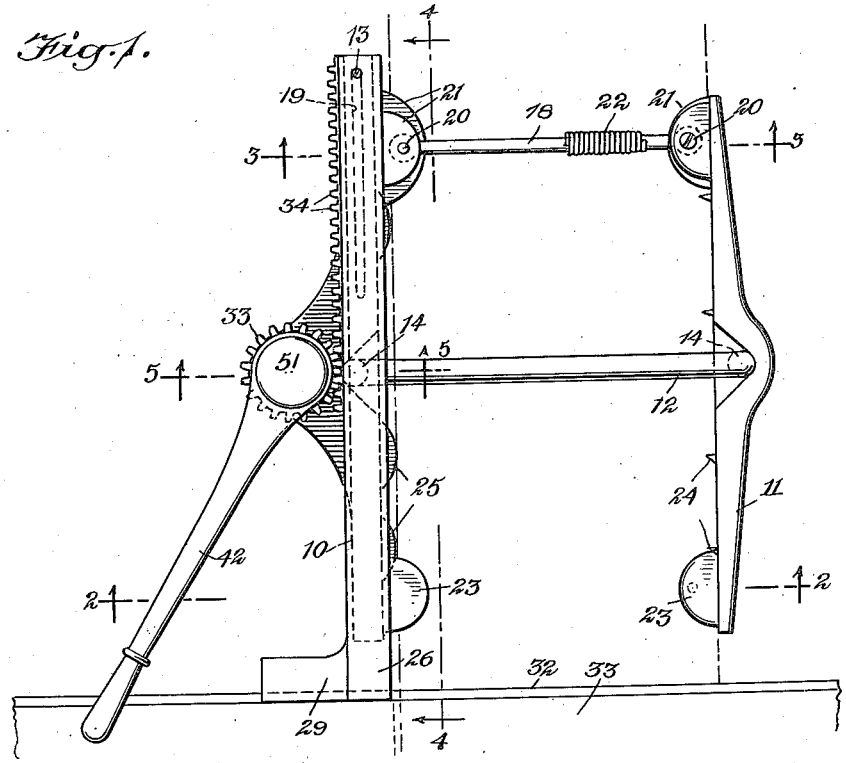
INVENTOR
Guillermo Solomon June 21, 1938.   G. SOLOMON   2,121,576
CLAMP
Filed Sept. 1, 1937   2 Sheets-Sheet 2
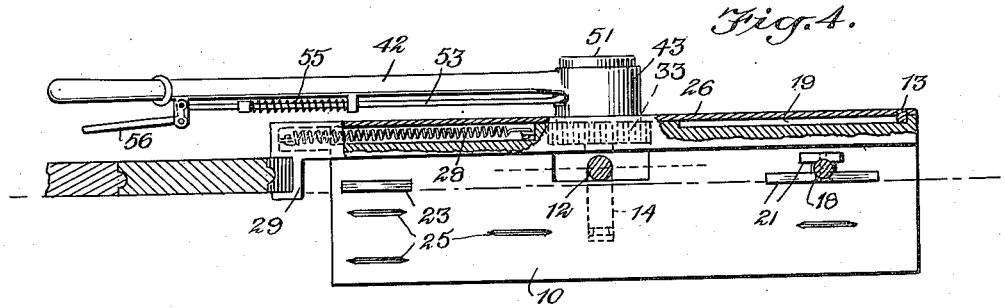
Fig. 4.
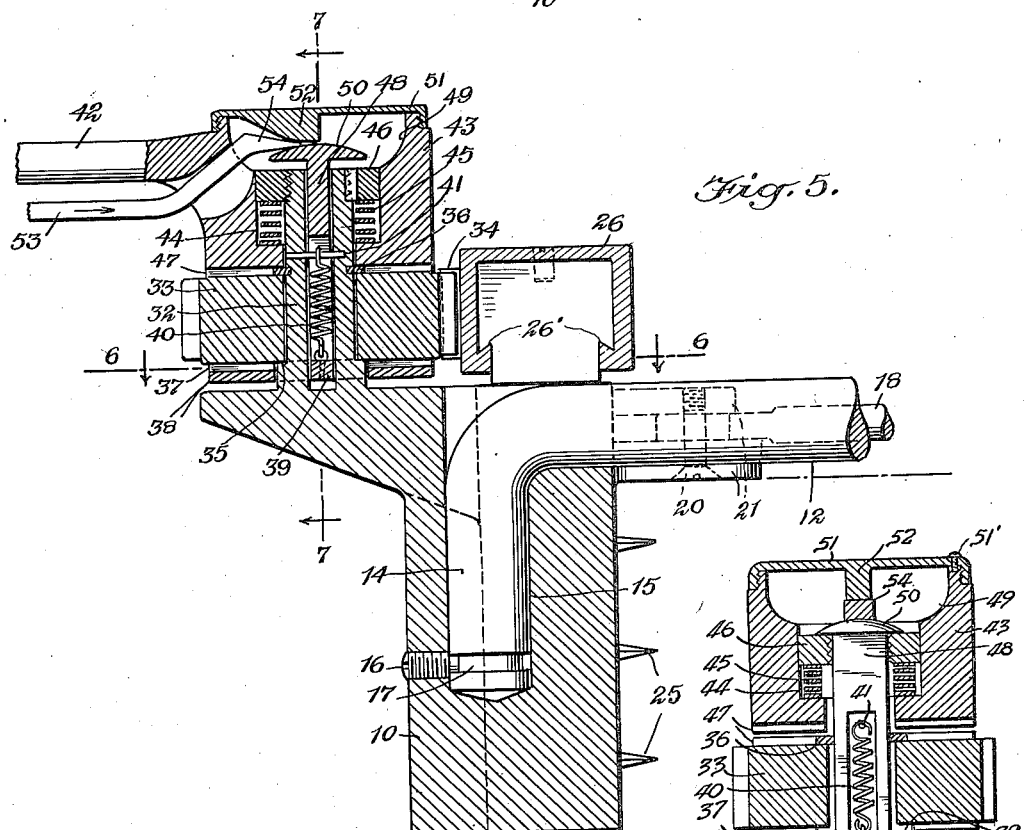
Fig. 5.
Fig. 6.
Fig. 7.
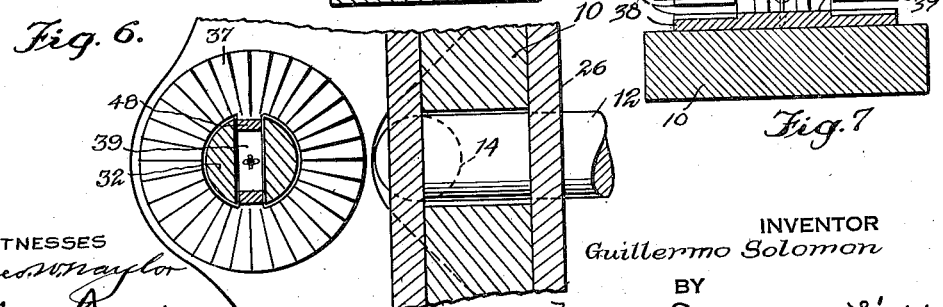
WITNESSES
Geo. W. Naylor
A. W. Foster
INVENTOR
Guillermo Solomon
BY
Munn Anderson & Liddy
ATTORNEYS Patented June 21, 1938

2,121,576

UNITED STATES PATENT OFFICE 2,121,576

CLAMP

Guillermo Solomon, Santiago, Dominican Republic, West Indies

Application September 1, 1937, Serial No. 161,918

4 Claims. (Cl. 254—12)

This invention relates to clamps and more specifically to a carpenter's tool which is designed to securely hold tongue and groove boards in position for the proper laying of boards while nailing the same.

The invention embodies many novel features of construction and combinations and arrangements of parts all of which will be more fully hereinafter described and pointed out in the claims.

In the accompanying drawings:

Fig. 1 is a plan view showing my improved clamp in operative position;

Fig. 2 is a view in transverse section on the line 2—2 of Fig. 1;

Fig. 3 is a view in transverse section on the line 3—3 of Fig. 1;

Fig. 4 is a view mainly in longitudinal section on the line 4—4 of Fig. 1, but showing parts broken away and in section to illustrate details of construction;

Fig. 5 is an enlarged view in section on the line 5—5 of Fig. 1, showing the position of parts with the parts in working position;

Fig. 6 is a fragmentary sectional plan view on the line 6—6 of Fig. 5;

Fig. 7 is a view in vertical section on the line 7—7 of Fig. 5, but showing the parts disengaged.

My improved clamp includes a pair of parallel clamping bars 10 and 11 which at their central portions are connected by a pivoted link 12. The ends of the link 12 which are circular in cross section are bent downwardly at right angles forming cylindrical pivot pins 14 which are mounted in sockets 15 in the bars 10 and 11 and are held against vertical displacement by means of screws 16 which project into annular grooves 17 in the pins 14.

The clamping bars 10 and 11 preferably near one end are also connected by a pivoted link 18 which is preferably in sections, and the ends of this link 18 are pivotally connected by pins 20 to bifurcated tongues 21 on the bars. The purpose of this link 18 is to always maintain the bars 10 and 11 in parallelism, and the link 18 between sections thereof is connected by a coil spring 22. The bifurcated tongues 21 and also other tongues 23 on the inner faces of the bars 10 and 11 are adapted to rest upon the surface of a joist or other timber, and the tongues 21 and 23 on the bars 10 and 11 have downwardly projecting spurs 24 to bite into the timber.

The bar 11 on its inner face is provided with a series of sharp spurs 24 to bite into the face of the timber, and on the inner face of the bar 10 longitudinally rounded spurs 25 are provided to bite into the face of the timber but permit a longitudinal movement of the bar 10 relative to the timber.

On the bar 10 a plunger 26 is mounted to move longitudinally and this plunger in cross section is of general inverted channel shape and provided at its lower edges with inwardly projecting flanges 26' which ride in corresponding grooves in the bar 10, and said bar 10 in its upper face is recessed as shown at 27 to accommodate a coil spring 28 which connects the plunger 26 and the bar 10 and normally tends to move the plunger in one direction. This plunger 26 at one end is provided with a laterally projecting head 29 which is grooved in its outer face as shown at 30 to accommodate a cushioning block 31 therein which is adapted to engage a tongue 32' of a tongue and groove member 33' to press the latter tightly in place.

A stop pin 13 on plunger 26 rides in a groove 19 in bar 10 to limit the movement of the plunger.

The bar 10 is formed on its upper face with an integral longitudinally slotted pivot pin 32 and on this pivot pin a gear wheel 33 is mounted to turn and meshes with a rack 34 on the plunger 26. This gear wheel 33 is held against vertical movement by means of a shoulder 35 below the same and on which it rests and by a washer 36 secured to the pin 32 above the gear wheel 33. This gear wheel 33 is formed on its lower face with a circular series of ratchet teeth 37 which engage a ratchet disk 38, and this disk 38 has a cross member 39 extending through the slotted pin 32 to hold the disk against rotary movement, and a coil spring 40 connects the cross member 39 with a transverse pin 41 to hold the ratchet disk in normal engagement with the ratchet teeth 37.

42 represents a hand lever which is provided at one end with a head 43 having rotary mounting on the upper end of the pin 32, and this head 43 is recessed as shown at 44 to accommodate a spring 45 located between a cap screw 46 keyed on pin 32 and the lower portion of the head 43 to exert a downward yielding pressure on the head to maintain the engagement of the inter-meshing ratchet teeth 47 on the head 43 and gear wheel 33 to permit the gear wheel to be turned when an oscillating movement is imparted to the lever 42.

A bifurcated key 48 is located in the slotted pin 32 and bears at its lower end against the ratchet disk 38. The upper end of this key 48 is located in a recess 49 in the head 43 and is formed with a mushroom head 50. A cap or closure member 51 is screwed on to the upper end of the head 43 and constitutes the top wall of the recess 49 and is provided with a cam-like enlargement 52 located above the head 50 of pin 48. A screw 51' holds the cap against accidental movement.

The lever 42 carries a longitudinally movable rod 53 which at its inner end is formed with a wedge 54 normally located as shown in Fig. 5 within the head 43 and adapted when moved longitudinally in one direction to exert a wedge action between the cam-like enlargement 52 and the head 50 of key 48 to force the key downward and likewise force the ratchet disk 38 downward and the head 43 upwardly to release the gear wheel 33. This rod 53 is held in its retracted position by coil spring 55 and is moved in the opposite direction by a pivoted finger lever 56.

The operation of the apparatus above described is as follows: The clamping bars 10 and 11 are positioned at opposite sides of the joist with the plunger head 29 located against the tongue and groove board. The operator then swings the lever 42 which through the medium of the ratchet teeth 47 imparts a partial turning movement to the gear wheel 33 which transmits the motion through the rack 34 to impart a longitudinal movement to the plunger 26 and also causes the bar 10 to move in the opposite direction drawing the clamping bars 10 and 11 in gripping engagement with the joist. The lever 42 may be oscillated as much as desired to securely clamp the joist and to press the board in position, it being understood that the ratchet disk 38 holds the gear wheel 33 against retrograde movement.

When it is desired to release the clamp the operator moves the finger lever 56 to cause the rod 53 to move longitudinally forcing the wedge 54 into engagement with the head 50 of pin 48 thus depressing the ratchet disk 38 and raising the head 43 to release the gear wheel 33. When this is done the coil spring 28 can retract the plunger 26 and the clamping bars 10 and 11 can be released from their clamping action for a repeated operation.

While I have illustrated and described what I believe to be the preferred embodiment of my invention, it is obvious that various changes might be made in the general form and arrangement of parts without departing from the invention, and hence I do not limit myself to the specific details set forth but consider myself at liberty to make such changes and alterations as fairly fall within the spirit and scope of the appended claims.

I claim:

1. A device of the character described, including a pair of normally parallel clamping bars, a link pivotally connecting said bars, a plunger mounted to move longitudinally on one of the bars and adapted at its end to engage a member, a lever pivotally mounted on the bar carrying the plunger, a gear wheel turned by the lever, and a rack on the plunger meshing with the gear wheel, a ratchet disk operatively connecting the gear wheel and holding same against retrograde movement, ratchet teeth between the lever and the gear wheel, and manually operated means adapted to move the ratchet disk and release the gear wheel.

2. A device of the character described, including a pair of normally parallel clamping bars, a link pivotally connecting said bars, a plunger mounted to move longitudinally on one of the bars and adapted at its end to engage a member, a lever pivotally mounted on the bar carrying the plunger, a gear wheel turned by the lever, and a rack on the plunger meshing with the gear wheel, a ratchet disk operatively connecting the gear wheel and holding the same against retrograde movement, ratchet teeth between the lever and the gear wheel, and manually operated means adapted to move the ratchet disk and release the gear wheel, said last mentioned means including a vertically movable key engaging the ratchet disk, a rod mounted to move longitudinally of the lever and a wedge on said rod adapted to engage the key and move the ratchet disk to inoperative position.

3. A device of the character described, including a pair of normally parallel clamping bars, a link pivotally connecting said bars, a plunger mounted to move longitudinally on one of the bars and adapted at its end to engage a member, a lever pivotally mounted on the bar carrying the plunger, a gear wheel turned by the lever, and a rack on the plunger meshing with the gear wheel, a ratchet disk operatively connecting the gear wheel and holding same against retrograde movement, ratchet teeth between the lever and the gear wheel, and manually operated means adapted to move the ratchet disk and release the gear wheel, said last mentioned means including a vertically movable key engaging the ratchet disk, a rod mounted to move longitudinally of the lever and a wedge on said rod adapted to engage the key and move the ratchet disk to inoperative position, said key having a mushroom head, and a cam enlargement constituting a fixed part above the head and between which and the head said wedge is movable.

4. A device of the character described, including a pair of normally parallel clamping bars, a link pivotally connecting said bars, a plunger mounted to move longitudinally on one of the bars and adapted at its end to engage a member, a lever pivotally mounted on the bar carrying the plunger, a gear wheel turned by the lever, and a rack on the plunger meshing with the gear wheel, a ratchet disk operatively connecting the gear wheel and holding same against retrograde movement, ratchet teeth between the lever and the gear wheel, and manually operated means adapted to move the ratchet disk and release the gear wheel, said last mentioned means including a vertically movable key engaging the ratchet disk, a rod mounted to move longitudinally of the lever and a wedge on said rod adapted to engage the key and move the ratchet disk to inoperative position, said key having a mushroom head, and a cam enlargement constituting a fixed part above the head and between which and the head said wedge is movable, a spring normally holding the rod in retracted position and a finger lever operatively engaging the rod.

GUILLERMO SOLOMON.